United States Patent
Lee et al.

(10) Patent No.: US 10,555,208 B2
(45) Date of Patent: Feb. 4, 2020

(54) METHOD FOR PERFORMING A BUFFER STATUS REPORTING IN A WIRELESS COMMUNICATION SYSTEM AND DEVICE THEREFOR

(71) Applicant: LG ELECTRONICS INC., Seoul (KR)

(72) Inventors: Sunyoung Lee, Seoul (KR); Seungjune Yi, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 23 days.

(21) Appl. No.: 15/551,857

(22) PCT Filed: Mar. 8, 2016

(86) PCT No.: PCT/KR2016/002293
§ 371 (c)(1),
(2) Date: Aug. 17, 2017

(87) PCT Pub. No.: WO2016/159528
PCT Pub. Date: Oct. 6, 2016

(65) Prior Publication Data
US 2018/0027443 A1    Jan. 25, 2018

Related U.S. Application Data

(60) Provisional application No. 62/140,431, filed on Mar. 30, 2015.

(51) Int. Cl.
*H04W 28/02* (2009.01)
*H04W 72/12* (2009.01)
(Continued)

(52) U.S. Cl.
CPC ... *H04W 28/0278* (2013.01); *H04W 72/1284* (2013.01); *H04W 80/02* (2013.01); *H04W 24/10* (2013.01)

(58) Field of Classification Search
CPC ..... H04W 24/02; H04W 24/08; H04W 24/10; H04W 28/02; H04W 28/0278;
(Continued)

(56) References Cited

U.S. PATENT DOCUMENTS 10,085,254 B2 * 9/2018 Yi ................... H04W 72/1205
2009/0296637 A1 * 12/2009 Fischer ................ G08C 17/02
370/328
(Continued)

FOREIGN PATENT DOCUMENTS

WO    WO 2014/185647 A1    11/2014

OTHER PUBLICATIONS

3GPP, "3rd Generation Partnership Project; Technical Specification Group Radio Access Network; Evolved Universal Terrestrial Radio Access (E-UTRA); Medium Access Control (MAC) protocol specification (Release 12)," 3GPP TS 36.321, V12.5.0, Mar. 2015, pp. 1-77.

*Primary Examiner* — Afshawn M Towfighi
(74) *Attorney, Agent, or Firm* — Birch, Stewart, Kolasch & Birch, LLP

(57) ABSTRACT

The present invention relates to a wireless communication system. More specifically, the present invention relates to a method and a device for performing a buffer status reporting in a wireless communication system, the method comprising: triggering a BSR in a MAC entity; generating a first BSR MAC CE including information of an amount of data available for transmission in RLC and PDCP entities and a second BSR MAC CE including information of an amount of data available for transmission in the PDCP entity; and transmitting a MAC PDU including the first and second BSR MAC CEs to a corresponding eNB.

14 Claims, 9 Drawing Sheets

(51) Int. Cl.
*H04W 80/02* (2009.01)
*H04W 24/10* (2009.01)

(58) Field of Classification Search
CPC . H04W 28/06; H04W 72/0413; H04W 72/12; H04W 72/1242; H04W 72/1268; H04W 72/1284; H04W 72/14; H04W 76/14; H04W 76/27; H04W 80/02; H04W 88/02; H04W 88/08; H04L 5/0053; H04L 47/30; H04L 69/32
See application file for complete search history.

(56) References Cited

U.S. PATENT DOCUMENTS

| | | | |
|---|---|---|---|
| 2010/0074168 A1* | 3/2010 | Wu | H04L 47/35 370/328 |
| 2010/0074222 A1 | 3/2010 | Wu | |
| 2013/0089057 A1 | 4/2013 | Worrall et al. | |
| 2013/0114445 A1* | 5/2013 | Wen | H04L 5/0007 370/252 |
| 2014/0177560 A1* | 6/2014 | Guo | H04W 72/1268 370/329 |
| 2014/0293896 A1* | 10/2014 | Kuo | H04W 72/0413 370/329 |
| 2015/0003371 A1 | 1/2015 | Park et al. | |
| 2015/0071213 A1* | 3/2015 | Pajukoski | H04W 72/1284 370/329 |
| 2015/0098322 A1* | 4/2015 | Chen | H04W 72/0413 370/230 |
| 2015/0117241 A1* | 4/2015 | Koc | H04W 76/18 370/252 |
| 2015/0117245 A1* | 4/2015 | Zhang | H04W 72/1284 370/252 |
| 2015/0245349 A1* | 8/2015 | Jha | H04W 28/0205 370/329 |
| 2015/0289253 A1* | 10/2015 | Pan | H04W 76/14 370/329 |
| 2015/0296407 A1* | 10/2015 | Guo | H04W 72/1284 370/230 |
| 2016/0037526 A1* | 2/2016 | Kim | H04L 5/001 370/329 |
| 2016/0044737 A1* | 2/2016 | Kwon | H04W 76/14 370/328 |
| 2016/0157256 A1* | 6/2016 | Tseng | H04W 72/1284 370/329 |
| 2016/0234714 A1* | 8/2016 | Basu Mallick | H04W 28/085 |
| 2016/0242193 A1* | 8/2016 | Hong | H04W 76/10 |
| 2016/0286412 A1* | 9/2016 | Kim | H04W 76/025 |
| 2017/0006649 A1* | 1/2017 | Zhao | H04W 28/06 |
| 2017/0013634 A1* | 1/2017 | Tsuboi | H04W 76/14 |
| 2017/0086168 A1* | 3/2017 | Takahashi | H04W 72/1284 |
| 2017/0111932 A1* | 4/2017 | Uemura | H04W 74/0833 |
| 2017/0285105 A1* | 10/2017 | Uemura | H04W 28/06 |
| 2018/0176974 A1* | 6/2018 | Fujishiro | H04L 5/001 |

* cited by examiner

[Fig. 1]
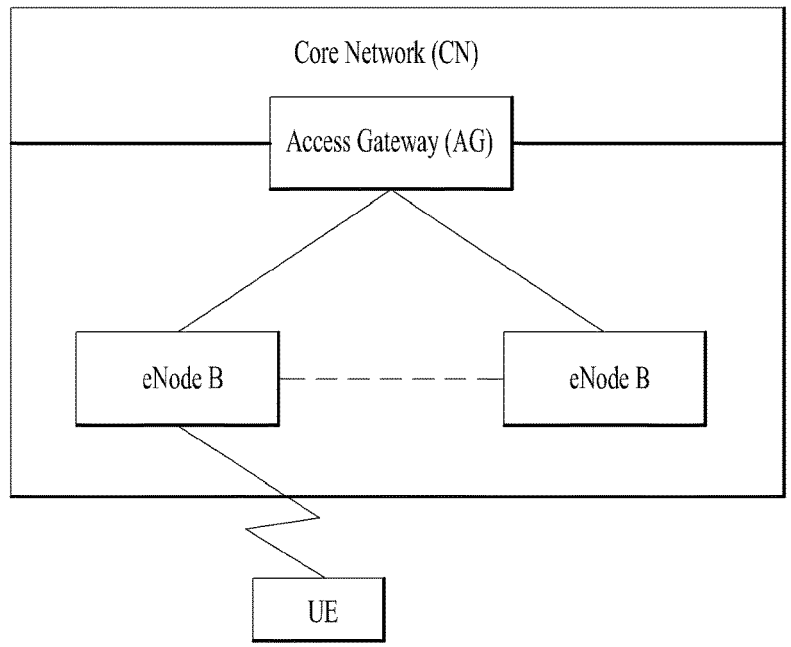
[Fig. 2A]
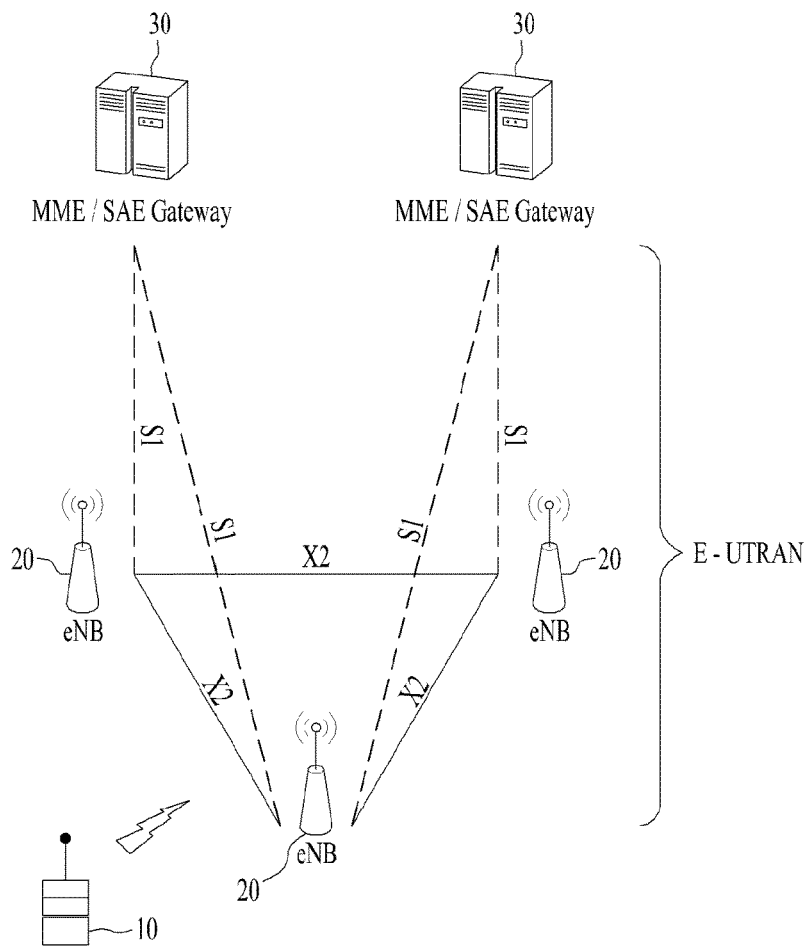

[Fig. 2B]
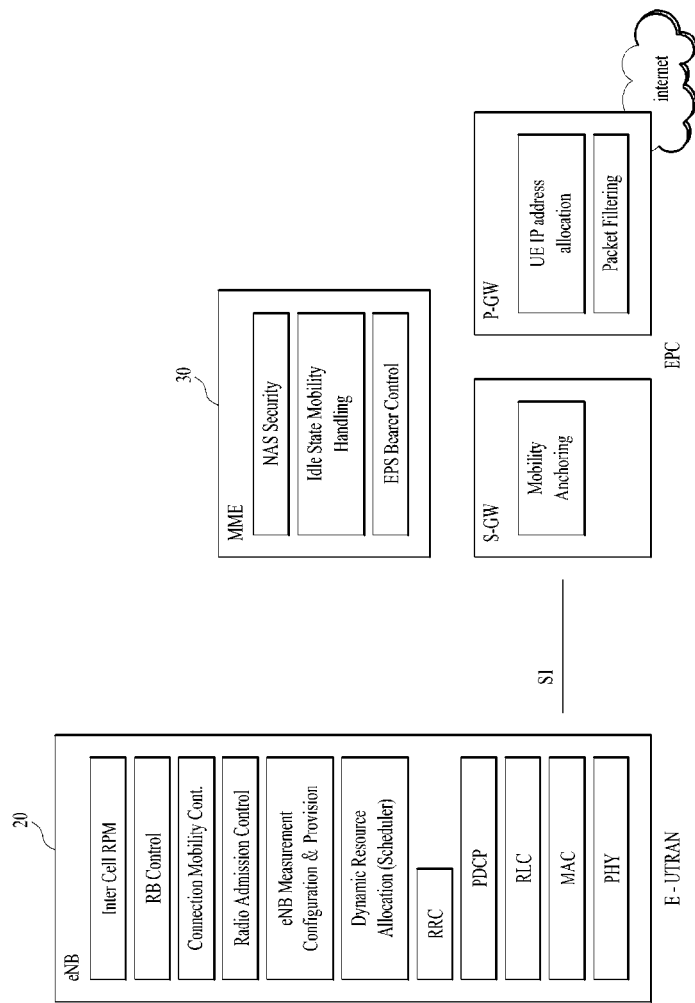

[Fig. 3]
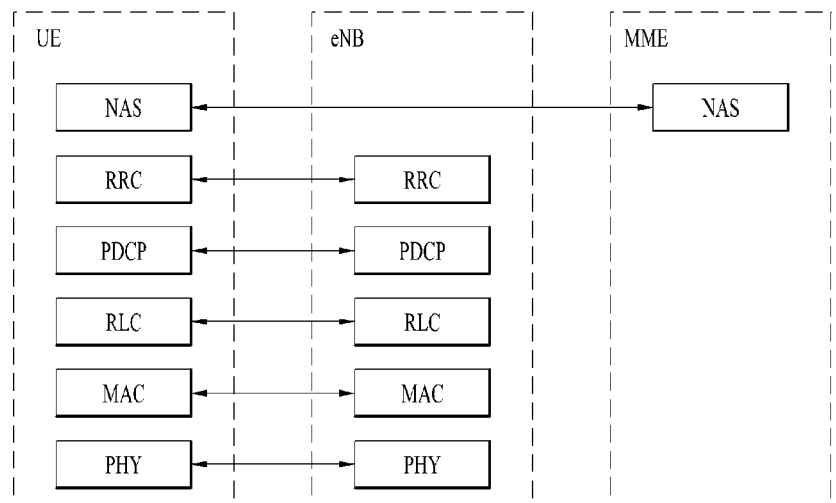
(a) Control-Plane Protocol Stack
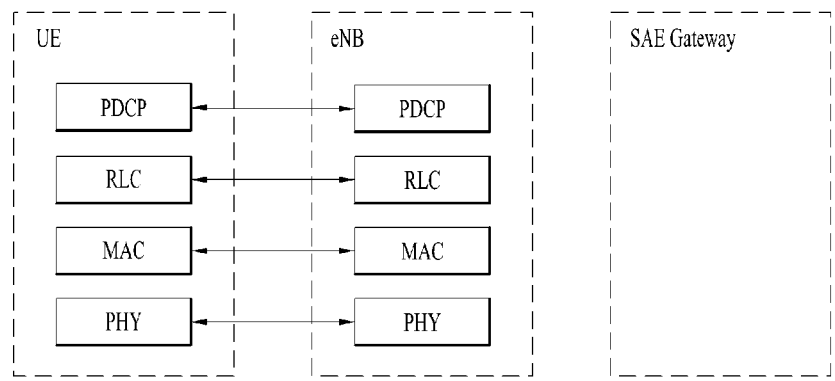
(b) User-Plane Protocol Stack
[Fig. 4]
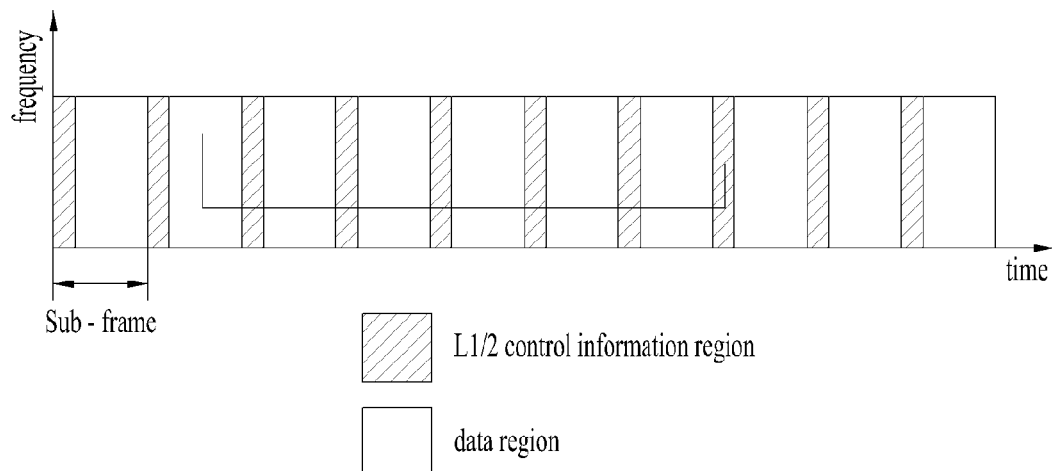

[Fig. 5]
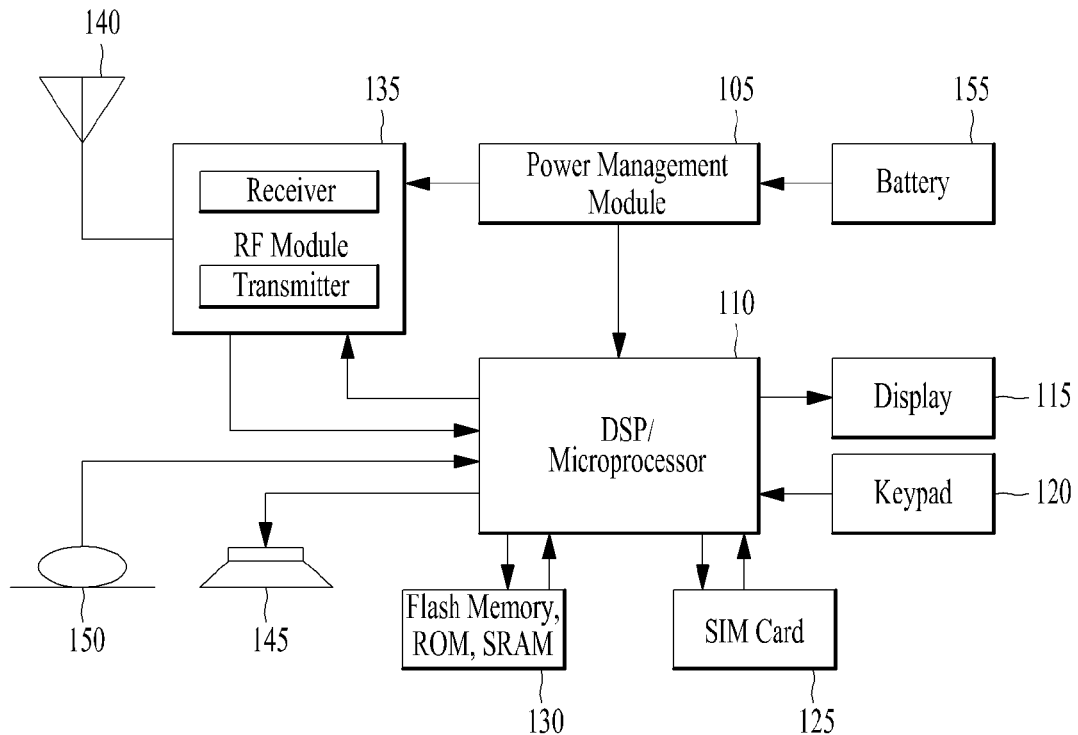
[Fig. 6]
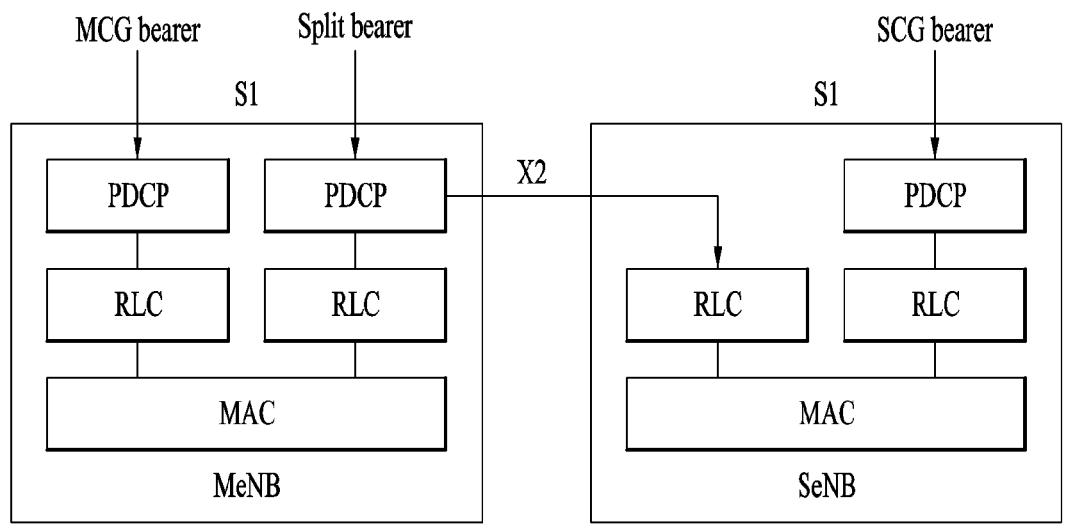

[Fig. 7]
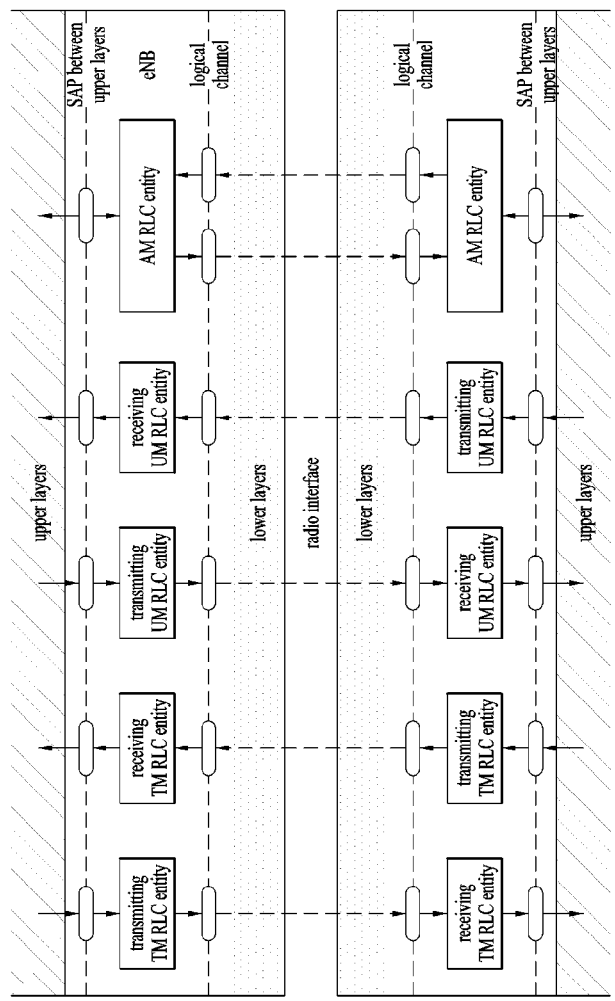

[Fig. 8]
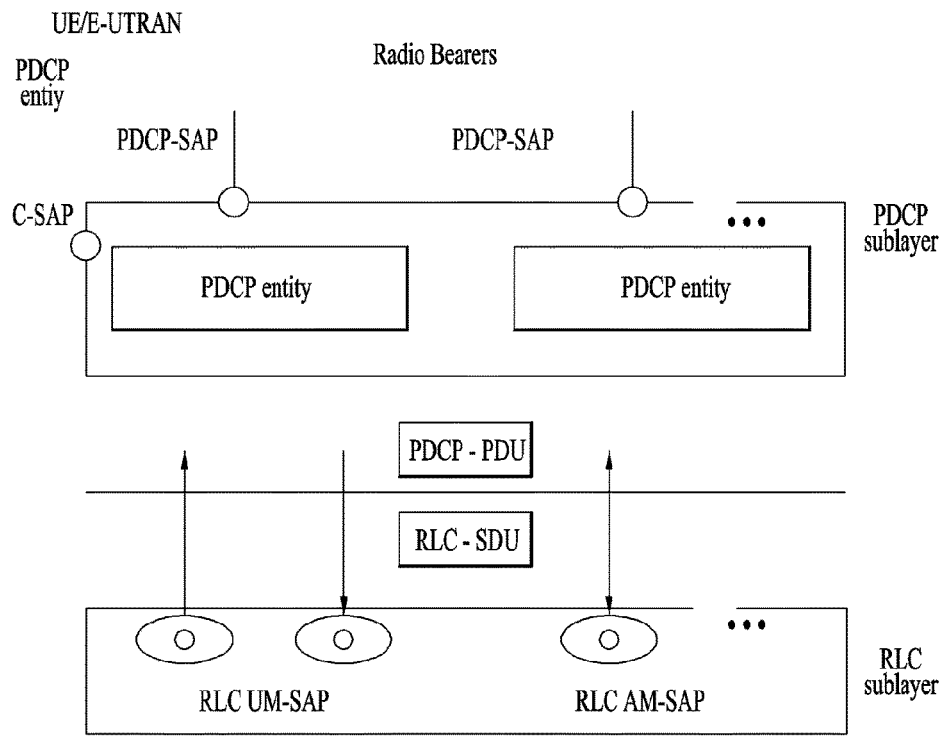
[Fig. 9]
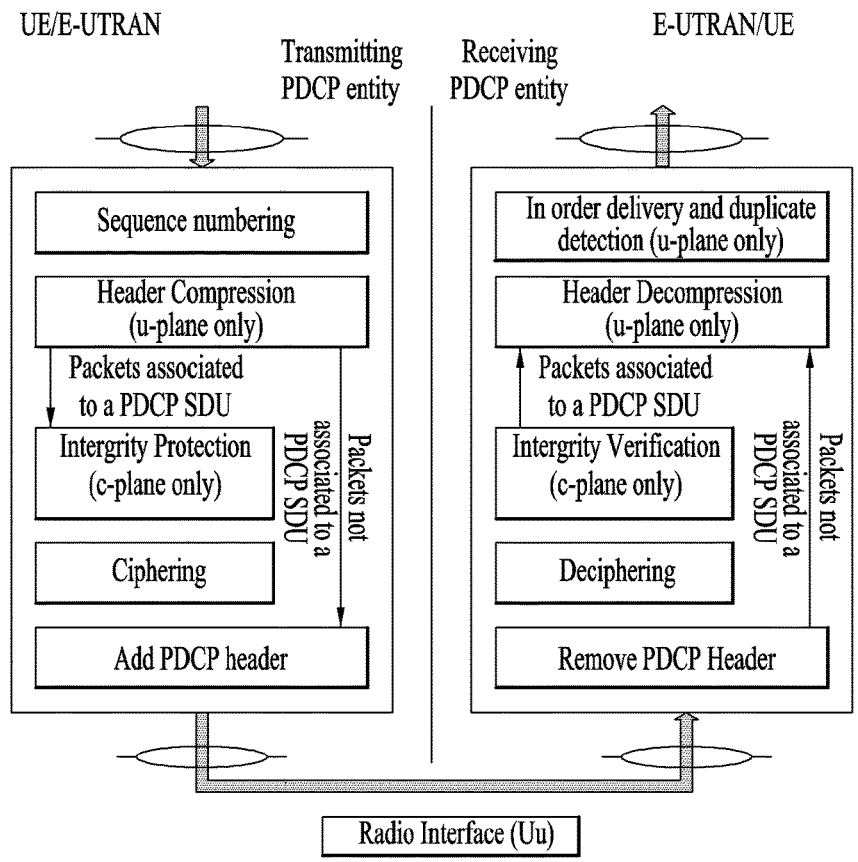

[Fig. 10]
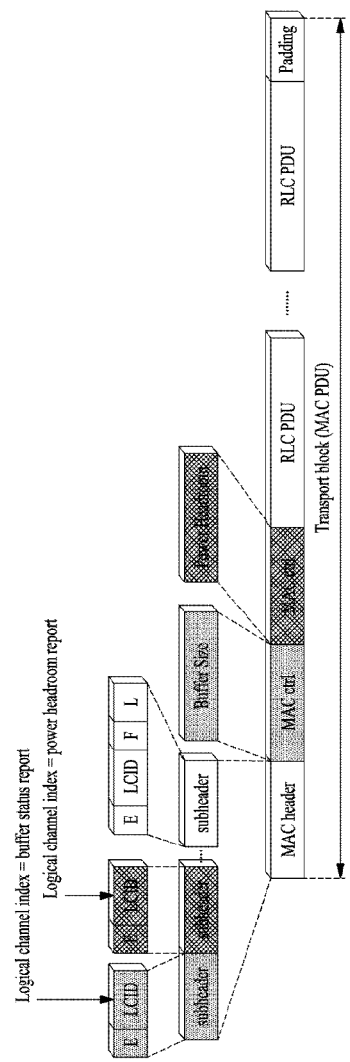
[Fig. 11A]
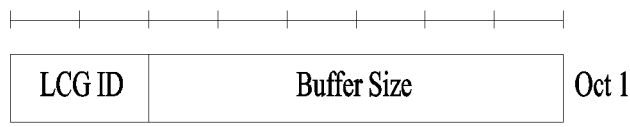
[Fig. 11B]
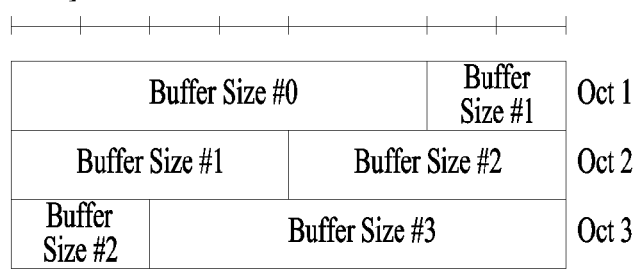

[Fig. 12]
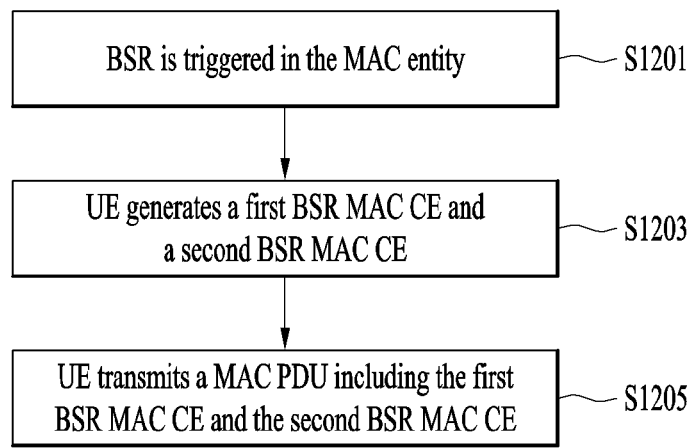
[Fig. 13A]
[Fig. 13B]
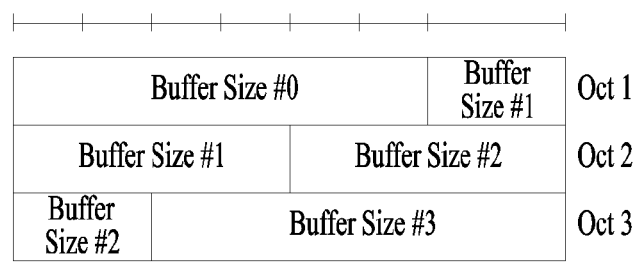

[Fig. 14]
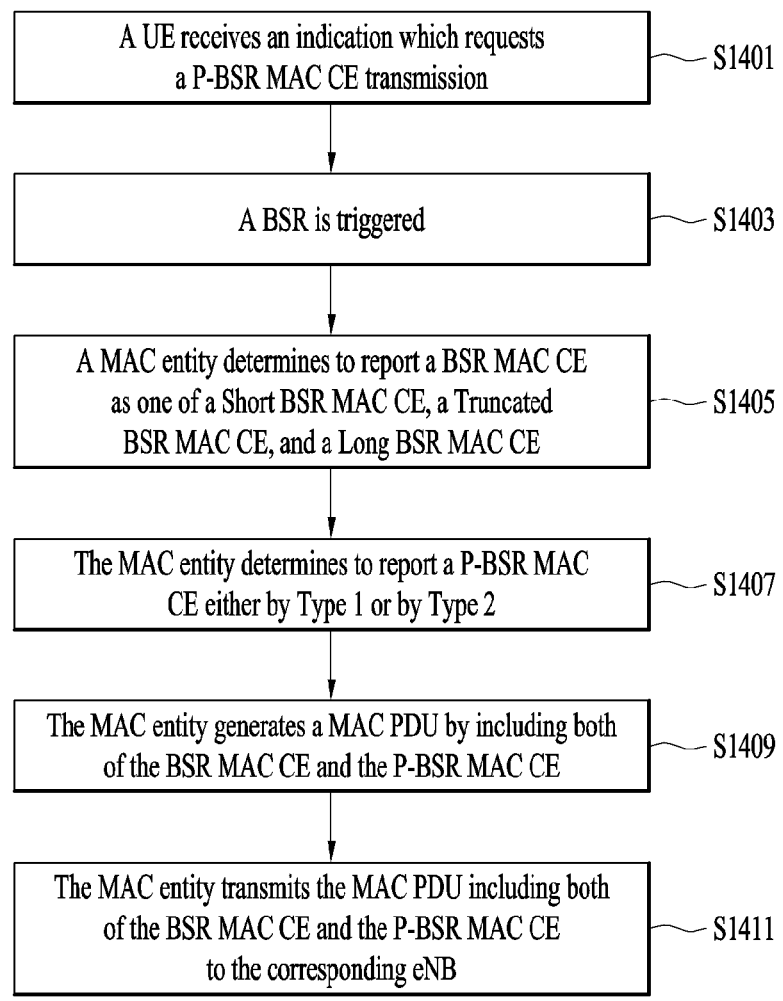

METHOD FOR PERFORMING A BUFFER STATUS REPORTING IN A WIRELESS COMMUNICATION SYSTEM AND DEVICE THEREFOR

CROSS REFERENCE TO RELATED APPLICATIONS

This application is the National Phase of PCT International Application No. PCT/KR2016/002293, filed on Mar. 8, 2016, which claims priority under 35 U.S.C. 119(e) to U.S. Provisional Application No. 62/140,431, filed on Mar. 30, 2015, all of which are hereby expressly incorporated by reference into the present application.

TECHNICAL FIELD

The present invention relates to a wireless communication system and, more particularly, to a method for performing a buffer status reporting in a wireless communication system and a device therefor.

BACKGROUND ART

As an example of a mobile communication system to which the present invention is applicable, a 3rd Generation Partnership Project Long Term Evolution (hereinafter, referred to as LTE) communication system is described in brief.

FIG. 1 is a view schematically illustrating a network structure of an E-UMTS as an exemplary radio communication system. An Evolved Universal Mobile Telecommunications System (E-UMTS) is an advanced version of a conventional Universal Mobile Telecommunications System (UMTS) and basic standardization thereof is currently underway in the 3GPP. E-UMTS may be generally referred to as a Long Term Evolution (LTE) system. For details of the technical specifications of the UMTS and E-UMTS, reference can be made to Release 7 and Release 8 of "3rd Generation Partnership Project; Technical Specification Group Radio Access Network".

Referring to FIG. 1, the E-UMTS includes a User Equipment (UE), eNode Bs (eNBs), and an Access Gateway (AG) which is located at an end of the network (E-UTRAN) and connected to an external network. The eNBs may simultaneously transmit multiple data streams for a broadcast service, a multicast service, and/or a unicast service.

One or more cells may exist per eNB. The cell is set to operate in one of bandwidths such as 1.25, 2.5, 5, 10, 15, and 20 MHz and provides a downlink (DL) or uplink (UL) transmission service to a plurality of UEs in the bandwidth. Different cells may be set to provide different bandwidths. The eNB controls data transmission or reception to and from a plurality of UEs. The eNB transmits DL scheduling information of DL data to a corresponding UE so as to inform the UE of a time/frequency domain in which the DL data is supposed to be transmitted, coding, a data size, and hybrid automatic repeat and request (HARQ)-related information. In addition, the eNB transmits UL scheduling information of UL data to a corresponding UE so as to inform the UE of a time/frequency domain which may be used by the UE, coding, a data size, and HARQ-related information. An interface for transmitting user traffic or control traffic may be used between eNBs. A core network (CN) may include the AG and a network node or the like for user registration of UEs. The AG manages the mobility of a UE on a tracking area (TA) basis. One TA includes a plurality of cells.

Although wireless communication technology has been developed to LTE based on wideband code division multiple access (WCDMA), the demands and expectations of users and service providers are on the rise. In addition, considering other radio access technologies under development, new technological evolution is required to secure high competitiveness in the future. Decrease in cost per bit, increase in service availability, flexible use of frequency bands, a simplified structure, an open interface, appropriate power consumption of UEs, and the like are required.

DISCLOSURE OF INVENTION

Technical Problem

An object of the present invention devised to solve the problem lies in a method and device for a method for performing a buffer status reporting in a wireless communication system. The technical problems solved by the present invention are not limited to the above technical problems and those skilled in the art may understand other technical problems from the following description.

Solution to Problem

The object of the present invention can be achieved by providing a method for User Equipment (UE) operating in a wireless communication system as set forth in the appended claims.

In another aspect of the present invention, provided herein is a communication apparatus as set forth in the appended claims.

It is to be understood that both the foregoing general description and the following detailed description of the present invention are exemplary and explanatory and are intended to provide further explanation of the invention as claimed.

Advantageous Effects of Invention

According to the present invention, buffer status reporting can be efficiently and accurately performed in a wireless communication system. Specifically, if a BSR is triggered in a MAC entity, the MAC entity generates a MAC PDU to transmit to a corresponding eNB by including both of a BSR MAC CE and another BSR MAC CE including only an amount of data available for transmission in PDCP entity in the same MAC PDU.

It will be appreciated by persons skilled in the art that the effects achieved by the present invention are not limited to what has been particularly described hereinabove and other advantages of the present invention will be more clearly understood from the following detailed description taken in conjunction with the accompanying drawings.

BRIEF DESCRIPTION OF DRAWINGS

The accompanying drawings, which are included to provide a further understanding of the invention and are incorporated in and constitute a part of this application, illustrate embodiment(s) of the invention and together with the description serve to explain the principle of the invention.

FIG. 1 is a diagram showing a network structure of an Evolved Universal Mobile Telecommunications System (E-UMTS) as an example of a wireless communication system;

FIG. 2A is a block diagram illustrating network structure of an evolved universal mobile telecommunication system (E-UMTS), and FIG. 2B is a block diagram depicting architecture of a typical E-UTRAN and a typical EPC;

FIG. 3 is a diagram showing a control plane and a user plane of a radio interface protocol between a UE and an E-UTRAN based on a 3rd generation partnership project (3GPP) radio access network standard;

FIG. 4 is a view showing an example of a physical channel structure used in an E-UMTS system;

FIG. 5 is a block diagram of a communication apparatus according to an embodiment of the present invention;

FIG. 6 is a conceptual diagram for radio protocol architecture for dual connectivity;

FIG. 7 is a conceptual diagram illustrating for overview model of the RLC sub layer;

FIG. 8 is a conceptual diagram for a PDCP entity architecture;

FIG. 9 is a conceptual diagram for functional view of a PDCP entity;

FIG. 10 is a diagram for signaling of buffer status and power-headroom reports;

FIG. 11A is a diagram for a Short BSR and Truncated BSR MAC control element,

FIG. 11B is for a Long BSR MAC control element;

FIG. 12 is a conceptual diagram for performing buffer status reporting according to embodiments of the present invention;

FIGS. 13A and 13B are examples for type of the second BSR MAC CE according to embodiments of the present invention; and FIG. 14 is an example for performing buffer status reporting according to embodiments of the present invention.

BEST MODE FOR CARRYING OUT THE INVENTION

Universal mobile telecommunications system (UMTS) is a 3rd Generation (3G) asynchronous mobile communication system operating in wideband code division multiple access (WCDMA) based on European systems, global system for mobile communications (GSM) and general packet radio services (GPRS). The long-term evolution (LTE) of UMTS is under discussion by the 3rd generation partnership project (3GPP) that standardized UMTS.

3GPP LTE is a technology for enabling high-speed packet communications. Many schemes have been proposed for the LTE objective including those that aim to reduce user and provider costs, improve service quality, and expand and improve coverage and system capacity. The 3G LTE requires reduced cost per bit, increased service availability, flexible use of a frequency band, a simple structure, an open interface, and adequate power consumption of a terminal as an upper-level requirement.

Hereinafter, structures, operations, and other features of the present invention will be readily understood from the embodiments of the present invention, examples of which are illustrated in the accompanying drawings. Embodiments described later are examples in which technical features of the present invention are applied to a 3GPP system.

Although the embodiments of the present invention are described using a long term evolution (LTE) system and a LTE-advanced (LTE-A) system in the present specification, they are purely exemplary. Therefore, the embodiments of the present invention are applicable to any other communication system corresponding to the above definition. In addition, although the embodiments of the present invention are described based on a frequency division duplex (FDD) scheme in the present specification, the embodiments of the present invention may be easily modified and applied to a half-duplex FDD (H-FDD) scheme or a time division duplex (TDD) scheme.

FIG. 2A is a block diagram illustrating network structure of an evolved universal mobile telecommunication system (E-UMTS). The E-UMTS may be also referred to as an LTE system. The communication network is widely deployed to provide a variety of communication services such as voice (VoIP) through IMS and packet data.

As illustrated in FIG. 2A, the E-UMTS network includes an evolved UMTS terrestrial radio access network (E-UTRAN), an Evolved Packet Core (EPC) and one or more user equipment. The E-UTRAN may include one or more evolved NodeB (eNodeB) 20, and a plurality of user equipment (UE) 10 may be located in one cell. One or more E-UTRAN mobility management entity (MME)/system architecture evolution (SAE) gateways 30 may be positioned at the end of the network and connected to an external network.

As used herein, "downlink" refers to communication from eNodeB 20 to UE 10, and "uplink" refers to communication from the UE to an eNodeB. UE 10 refers to communication equipment carried by a user and may be also referred to as a mobile station (MS), a user terminal (UT), a subscriber station (SS) or a wireless device.

FIG. 2B is a block diagram depicting architecture of a typical E-UTRAN and a typical EPC.

As illustrated in FIG. 2B, an eNodeB 20 provides end points of a user plane and a control plane to the UE 10. MME/SAE gateway 30 provides an end point of a session and mobility management function for UE 10. The eNodeB and MME/SAE gateway may be connected via an S1 interface.

The eNodeB 20 is generally a fixed station that communicates with a UE 10, and may also be referred to as a base station (BS) or an access point. One eNodeB 20 may be deployed per cell. An interface for transmitting user traffic or control traffic may be used between eNodeBs 20.

The MME provides various functions including NAS signaling to eNodeBs 20, NAS signaling security, AS Security control, Inter CN node signaling for mobility between 3GPP access networks, Idle mode UE Reachability (including control and execution of paging retransmission), Tracking Area list management (for UE in idle and active mode), PDN GW and Serving GW selection, MME selection for handovers with MME change, SGSN selection for handovers to 2G or 3G 3GPP access networks, Roaming, Authentication, Bearer management functions including dedicated bearer establishment, Support for PWS (which includes ETWS and CMAS) message transmission. The SAE gateway host provides assorted functions including Per-user based packet filtering (by e.g. deep packet inspection), Lawful Interception, UE IP address allocation, Transport level packet marking in the downlink, UL and DL service level charging, gating and rate enforcement, DL rate enforcement based on APN-AMBR. For clarity MME/SAE gateway 30 will be referred to herein simply as a "gateway," but it is understood that this entity includes both an MME and an SAE gateway.

A plurality of nodes may be connected between eNodeB 20 and gateway 30 via the S1 interface. The eNodeBs 20 may be connected to each other via an X2 interface and neighboring eNodeBs may have a meshed network structure that has the X2 interface.

As illustrated, eNodeB 20 may perform functions of selection for gateway 30, routing toward the gateway during a Radio Resource Control (RRC) activation, scheduling and transmitting of paging messages, scheduling and transmitting of Broadcast Channel (BCCH) information, dynamic allocation of resources to UEs 10 in both uplink and downlink, configuration and provisioning of eNodeB measurements, radio bearer control, radio admission control (RAC), and connection mobility control in LTE_ACTIVE state. In the EPC, and as noted above, gateway 30 may perform functions of paging origination, LTE-IDLE state management, ciphering of the user plane, System Architecture Evolution (SAE) bearer control, and ciphering and integrity protection of Non-Access Stratum (NAS) signaling.

The EPC includes a mobility management entity (MME), a serving-gateway (S-GW), and a packet data network-gateway (PDN-GW). The MME has information about connections and capabilities of UEs, mainly for use in managing the mobility of the UEs. The S-GW is a gateway having the E-UTRAN as an end point, and the PDN-GW is a gateway having a packet data network (PDN) as an end point.

FIG. 3 is a diagram showing a control plane and a user plane of a radio interface protocol between a UE and an E-UTRAN based on a 3GPP radio access network standard. The control plane refers to a path used for transmitting control messages used for managing a call between the UE and the E-UTRAN. The user plane refers to a path used for transmitting data generated in an application layer, e.g., voice data or Internet packet data.

A physical (PHY) layer of a first layer provides an information transfer service to a higher layer using a physical channel. The PHY layer is connected to a medium access control (MAC) layer located on the higher layer via a transport channel. Data is transported between the MAC layer and the PHY layer via the transport channel. Data is transported between a physical layer of a transmitting side and a physical layer of a receiving side via physical channels. The physical channels use time and frequency as radio resources. In detail, the physical channel is modulated using an orthogonal frequency division multiple access (OFDMA) scheme in downlink and is modulated using a single carrier frequency division multiple access (SC-FDMA) scheme in uplink.

The MAC layer of a second layer provides a service to a radio link control (RLC) layer of a higher layer via a logical channel. The RLC layer of the second layer supports reliable data transmission. A function of the RLC layer may be implemented by a functional block of the MAC layer. A packet data convergence protocol (PDCP) layer of the second layer performs a header compression function to reduce unnecessary control information for efficient transmission of an Internet protocol (IP) packet such as an IP version 4 (IPv4) packet or an IP version 6 (IPv6) packet in a radio interface having a relatively small bandwidth.

A radio resource control (RRC) layer located at the bottom of a third layer is defined only in the control plane. The RRC layer controls logical channels, transport channels, and physical channels in relation to configuration, re-configuration, and release of radio bearers (RBs). An RB refers to a service that the second layer provides for data transmission between the UE and the E-UTRAN. To this end, the RRC layer of the UE and the RRC layer of the E-UTRAN exchange RRC messages with each other.

One cell of the eNB is set to operate in one of bandwidths such as 1.25, 2.5, 5, 10, 15, and 20 MHz and provides a downlink or uplink transmission service to a plurality of UEs in the bandwidth. Different cells may be set to provide different bandwidths.

Downlink transport channels for transmission of data from the E-UTRAN to the UE include a broadcast channel (BCH) for transmission of system information, a paging channel (PCH) for transmission of paging messages, and a downlink shared channel (SCH) for transmission of user traffic or control messages. Traffic or control messages of a downlink multicast or broadcast service may be transmitted through the downlink SCH and may also be transmitted through a separate downlink multicast channel (MCH).

Uplink transport channels for transmission of data from the UE to the E-UTRAN include a random access channel (RACH) for transmission of initial control messages and an uplink SCH for transmission of user traffic or control messages. Logical channels that are defined above the transport channels and mapped to the transport channels include a broadcast control channel (BCCH), a paging control channel (PCCH), a common control channel (CCCH), a multicast control channel (MCCH), and a multicast traffic channel (MTCH).

FIG. 4 is a view showing an example of a physical channel structure used in an E-UMTS system. A physical channel includes several subframes on a time axis and several subcarriers on a frequency axis. Here, one subframe includes a plurality of symbols on the time axis. One subframe includes a plurality of resource blocks and one resource block includes a plurality of symbols and a plurality of subcarriers. In addition, each subframe may use certain subcarriers of certain symbols (e.g., a first symbol) of a subframe for a physical downlink control channel (PDCCH), that is, an L1/L2 control channel. In FIG. 4, an L1/L2 control information transmission area (PDCCH) and a data area (PDSCH) are shown. In one embodiment, a radio frame of 10 ms is used and one radio frame includes 10 subframes. In addition, one subframe includes two consecutive slots. The length of one slot may be 0.5 ms. In addition, one subframe includes a plurality of OFDM symbols and a portion (e.g., a first symbol) of the plurality of OFDM symbols may be used for transmitting the L1/L2 control information. A transmission time interval (TTI) which is a unit time for transmitting data is 1 ms.

A base station and a UE mostly transmit/receive data via a PDSCH, which is a physical channel, using a DL-SCH which is a transmission channel, except a certain control signal or certain service data. Information indicating to which UE (one or a plurality of UEs) PDSCH data is transmitted and how the UE receive and decode PDSCH data is transmitted in a state of being included in the PDCCH.

For example, in one embodiment, a certain PDCCH is CRC-masked with a radio network temporary identity (RNTI) "A" and information about data is transmitted using a radio resource "B" (e.g., a frequency location) and transmission format information "C" (e.g., a transmission block size, modulation, coding information or the like) via a certain subframe. Then, one or more UEs located in a cell monitor the PDCCH using its RNTI information. And, a specific UE with RNTI "A" reads the PDCCH and then receive the PDSCH indicated by B and C in the PDCCH information.

FIG. 5 is a block diagram of a communication apparatus according to an embodiment of the present invention.

The apparatus shown in FIG. 5 can be a user equipment (UE) and/or eNB adapted to perform the above mechanism, but it can be any apparatus for performing the same operation.

As shown in FIG. 5, the apparatus may comprises a DSP/microprocessor (110) and RF module (transmiceiver; 135). The DSP/microprocessor (110) is electrically connected with the transciver (135) and controls it. The apparatus may further include power management module (105), battery (155), display (115), keypad (120), SIM card (125), memory device (130), speaker (145) and input device (150), based on its implementation and designer's choice.

Specifically, FIG. 5 may represent a UE comprising a receiver (135) configured to receive a request message from a network, and a transmitter (135) configured to transmit the transmission or reception timing information to the network. These receiver and the transmitter can constitute the transceiver (135). The UE further comprises a processor (110) connected to the transceiver (135: receiver and transmitter).

Also, FIG. 5 may represent a network apparatus comprising a transmitter (135) configured to transmit a request message to a UE and a receiver (135) configured to receive the transmission or reception timing information from the UE. These transmitter and receiver may constitute the transceiver (135). The network further comprises a processor (110) connected to the transmitter and the receiver. This processor (110) may be configured to calculate latency based on the transmission or reception timing information.

FIG. 6 is a conceptual diagram for radio protocol architecture for dual connectivity.

E-UTRAN of the present example can support dual connectivity operation whereby a multiple receptions/transmissions(RX/TX) UE in RRC_CONNECTED is configured to utilize radio resources provided by two distinct schedulers, located in two eNBs (or base stations) connected via a non-ideal backhaul over the X2 interface. The eNBs involved in dual connectivity for a certain UE may assume two different roles: an eNB may either act as the MeNB or as the SeNB. In dual connectivity, a UE can be connected to one MeNB and one SeNB.

In the dual connectivity operation, the radio protocol architecture that a particular bearer uses depends on how the bearer is setup. Three alternatives exist, MCG bearer, split bearer and SCG bearer. Those three alternatives are depicted on FIG. 6. The SRBs (Signaling Radio Bearers) are always of the MCG bearer and therefore only use the radio resources provided by the MeNB. The MCG bearer is a radio protocol only located in the MeNB to use MeNB resources only in the dual connectivity. And the SCG bearer is a radio protocol only located in the SeNB to use SeNB resources in the dual connectivity.

Specially, the split bearer is a radio protocol located in both the MeNB and the SeNB to use both MeNB and SeNB resources in the dual connectivity and the split bearer may be a radio bearer comprising one Packet Data Convergence Protocol (PDCP) entity, two Radio Link Control (RLC) entities and two Medium Access Control (MAC) entities for one direction. Specially, the dual connectivity operation can also be described as having at least one bearer configured to use radio resources provided by the SeNB.

The expected benefits of the split bearer are: i) the SeNB mobility hidden to CN, ii) no security impacts with ciphering being required in MeNB only, iii) no data forwarding between SeNBs required at SeNB change, iv) offloads RLC processing of SeNB traffic from MeNB to SeNB, v) little or no impacts to RLC, vi) utilization of radio resources across MeNB and SeNB for the same bearer possible, vii) relaxed requirements for SeNB mobility (MeNB can be used in the meantime).

FIG. 7 is a conceptual diagram illustrating for overview model of the RLC sub layer.

Functions of the RLC sub layer are performed by RLC entities. For a RLC entity configured at the eNB, there is a peer RLC entity configured at the UE and vice versa. For an RLC entity configured at the transmitting UE for STCH or SBCCH there is a peer RLC entity configured at each receiving UE for STCH or SBCCH.

An RLC entity receives/delivers RLC SDUs from/to upper layer and sends/receives RLC PDUs to/from its peer RLC entity via lower layers. An RLC PDU can either be a RLC data PDU or a RLC control PDU. If an RLC entity receives RLC SDUs from upper layer, it receives them through a single SAP between RLC and upper layer, and after forming RLC data PDUs from the received RLC SDUs, the RLC entity delivers the RLC data PDUs to lower layer through a single logical channel. If an RLC entity receives RLC data PDUs from lower layer, it receives them through a single logical channel, and after forming RLC SDUs from the received RLC data PDUs, the RLC entity delivers the RLC SDUs to upper layer through a single SAP between RLC and upper layer. If an RLC entity delivers/receives RLC control PDUs to/from lower layer, it delivers/receives them through the same logical channel it delivers/receives the RLC data PDUs through.

An RLC entity can be configured to perform data transfer in one of the following three modes: Transparent Mode (TM), Unacknowledged Mode (UM) or Acknowledged Mode (AM). Consequently, an RLC entity is categorized as a TM RLC entity, an UM RLC entity or an AM RLC entity depending on the mode of data transfer that the RLC entity is configured to provide.

Data Available for Transmission in RLC Entity

For the purpose of MAC buffer status reporting, the UE shall consider the following as data available for transmission in the RLC layer: i) RLC SDUs, or segments thereof, that have not yet been included in an RLC data PDU, and ii) RLC data PDUs, or portions thereof, that are pending for retransmission (RLC AM).

In addition, if a STATUS PDU has been triggered and t-Status Prohibit is not running or has expired, the UE shall estimate the size of the STATUS PDU that will be transmitted in the next transmission opportunity, and consider this as data available for transmission in the RLC layer.

FIG. 8 is a conceptual diagram for a PDCP entity architecture.

FIG. 8 represents one possible structure for the PDCP sublayer, but it should not restrict implementation. Each RB (i.e. DRB and SRB, except for SRB0) is associated with one PDCP entity. Each PDCP entity is associated with one or two (one for each direction) RLC entities depending on the RB characteristic (i.e. unidirectional or bi-directional) and RLC mode. The PDCP entities are located in the PDCP sublayer. The PDCP sublayer is configured by upper layers.

FIG. 9 is a conceptual diagram for functional view of a PDCP entity.

The PDCP entities are located in the PDCP sublayer. Several PDCP entities may be defined for a UE. Each PDCP entity carrying user plane data may be configured to use header compression. Each PDCP entity is carrying the data of one radio bearer. In this version of the specification, only the robust header compression protocol (ROHC), is supported. Every PDCP entity uses at most one ROHC compressor instance and at most one ROHC decompressor instance. A PDCP entity is associated either to the control plane or the user plane depending on which radio bearer it is carrying data for.

FIG. 9 represents the functional view of the PDCP entity for the PDCP sublayer; it should not restrict implementation. The figure is based on the radio interface protocol architecture.

For split bearers, routing is performed in the transmitting PDCP entity, and reordering is performed in the receiving PDCP entity. When submitting PDCP PDUs to lower layers, the transmitting PDCP entity shall submit the PDCP PDUs to the associated AM RLC entity configured for SCG if ul-DataPath is set to scg by upper layers. And if else, the transmitting PDCP entity shall submit the PDCP PDUs to the associated AM RLC entity configured for MCG.

Data Available for Transmission in PDCP Entity

For the purpose of MAC buffer status reporting, the UE may consider PDCP Control PDUs, as well as the following as data available for transmission in the PDCP layer, for SDUs for which no PDU has been submitted to lower layers: i) the SDU itself, if the SDU has not yet been processed by PDCP, or ii) the PDU if the SDU has been processed by PDCP.

In addition, for radio bearers that are mapped on RLC AM, if the PDCP entity has previously performed the re-establishment procedure, the UE may also consider the following as data available for transmission in the PDCP layer, for SDUs for which a corresponding PDU has only been submitted to lower layers prior to the PDCP re-establishment, starting from the first SDU for which the delivery of the corresponding PDUs has not been confirmed by the lower layer, except the SDUs which are indicated as successfully delivered by the PDCP status report, if received: i) the SDU, if it has not yet been processed by PDCP, or ii) the PDU once it has been processed by PDCP.

For split bearers, when indicating the data available for transmission to the MAC entity, the UE may indicate the data available for transmission to the MAC entity configured for SCG if ul-DataPath is set to scg by upper layer. If else, the UE may indicate the data available for transmission to the MAC entity configured for MCG.

FIG. 10 is a diagram for signaling of buffer status and power-headroom reports.

The scheduler needs knowledge about the amount of data awaiting transmission from the terminals to assign the proper amount of uplink resources. Obviously, there is no need to provide uplink resources to a terminal with no data to transmit as this would only result in the terminal performing padding to fill up the granted resources. Hence, as a minimum, the scheduler needs to know whether the terminal has data to transmit and should be given a grant. This is known as a scheduling request.

Meanwhile, terminals that already have a valid grant obviously do not need to request uplink resources. However, to allow the scheduler to determine the amount of resources to grant to each terminal in future subframes, information about the buffer situation and the power availability is useful, as discussed above. This information is provided to the scheduler as part of the uplink transmission through MAC control element. The LCID field in one of the MAC subheaders is set to a reserved value indicating the presence of a buffer status report, as illustrated in FIG. 10.

From a scheduling perspective, buffer information for each logical channel is beneficial, although this could result in a significant overhead. Logical channels are therefore grouped into logical-channel groups and the reporting is done per group. The buffer-size field in a buffer-status report indicates the amount of data available transmission across all logical channels in a logical-channel group.

The Buffer Status Reporting (BSR) procedure is used to provide a serving eNB with information about the amount of data available for transmission (DAT) in the UL buffers of the UE. RRC may control BSR reporting by configuring the three timers periodic BSR-Timer and retxBSR-Timer and logical Channel SR-Prohibit Timer and by, for each logical channel, optionally signaling Logical Channel Group (LCG) which allocates the logical channel to an LCG.

A buffer status report represents one or all four logical-channel groups and can be triggered for the following reasons:

i) Arrival of data with higher priority than currently in the transmission buffer?that is, data in a logical-channel group with higher priority than the one currently being transmitted?as this may impact the scheduling decision. The UL data, for a logical channel which belongs to a LCG, becomes available for transmission in the RLC entity or in the PDCP entity and either the data belongs to a logical channel with higher priority than the priorities of the logical channels which belong to any LCG and for which data is already available for transmission, or there is no data available for transmission for any of the logical channels which belong to a LCG, in which case the BSR is referred below to as "Regular BSR".

ii) Change of serving cell, in which case a buffer-status report is useful to provide the new serving cell with information about the situation in the terminal.

iii) Periodically as controlled by a timer. A retxBSR-Timer expires and the UE has data available for transmission for any of the logical channels which belong to a LCG, in which case the BSR is referred below to as "Regular BSR", or a periodic BSR-Timer expires, in which case the BSR is referred below to as "Periodic BSR".

iv) Instead of padding. UL resources are allocated and number of padding bits is equal to or larger than the size of the Buffer Status Report MAC control element plus its subheader, in which case the BSR is referred below to as "Padding BSR". If the amount of padding required to match the scheduled transport block size is larger than a buffer-status report, a buffer-status report is inserted. Clearly it is better to exploit the available payload for useful scheduling information instead of padding if possible.

For Regular BSR, if the BSR is triggered due to data becoming available for transmission for a logical channel for which logicalChannelSR-ProhibitTimer is configured by upper layers, the MAC entity starts the logicalChannelSR-ProhibitTimer if not running. If running, the MAC entity stops the logicalChannelSR-ProhibitTimer.

For Regular and Periodic BSR, if more than one LCG has data available for transmission in the TTI where the BSR is transmitted, the UE may report Long BSR. If else, the UE may report Short BSR.

If the Buffer Status reporting procedure determines that at least one BSR has been triggered and not cancelled, if the UE has UL resources allocated for new transmission for this TTI, the UE may instruct the Multiplexing and Assembly procedure to generate the BSR MAC control element(s), start or restart periodic BSR-Timer except when all the generated BSRs are Truncated BSRs, and start or restart retxBSR-Timer.

A MAC PDU may contain at most one MAC BSR control element, even when multiple events trigger a BSR by the time a BSR can be transmitted in which case the Regular BSR and the Periodic BSR shall have precedence over the padding BSR.

The UE may restart retxBSR-Timer upon indication of a grant for transmission of new data on any UL-SCH.

All triggered BSRs may be cancelled in case UL grants in this subframe can accommodate all pending data available for transmission but is not sufficient to additionally accommodate the BSR MAC control element plus its subheader. All triggered BSRs shall be cancelled when a BSR is included in a MAC PDU for transmission.

The UE shall transmit at most one Regular/Periodic BSR in a TTI. If the UE is requested to transmit multiple MAC PDUs in a TTI, it may include a padding BSR in any of the MAC PDUs which do not contain a Regular/Periodic BSR.

All BSRs transmitted in a TTI always reflect the buffer status after all MAC PDUs have been built for this TTI. Each LCG shall report at the most one buffer status value per TTI and this value shall be reported in all BSRs reporting buffer status for this LCG.

FIG. 11A is a diagram for a Short BSR and Truncated BSR MAC control element, FIG. 11B is for a Long BSR MAC control element.

Buffer Status Report (BSR) MAC control elements consist of either: i) Short BSR and Truncated BSR format: one LCG ID field and one corresponding Buffer Size field or ii) Long BSR format: four Buffer Size fields, corresponding to LCG IDs #0 through #3.

The BSR formats are identified by MAC PDU subheaders with LCIDs as specified in Table 1.

TABLE 1

| Index | LCID values |
| --- | --- |
| 00000 | CCCH |
| 00001-01010 | Identity of the logical channel |
| 01011-10110 | Reserved |
| 10111 | ProSe Truncated BSR |
| 11000 | ProSe BSR |
| 11001 | Extended Power Headroom Report |
| 11010 | Power Headroom Report |
| 11011 | C-RNTI |
| 11100 | Truncated BSR |
| 11101 | Short BSR |
| 11110 | Long BSR |
| 11111 | Padding |

The fields LCG ID and Buffer Size are defined as follow:

LCG ID: The Logical Channel Group ID field identifies the group of logical channel(s) which buffer status is being reported. The length of the field is 2 bits;

Buffer Size: The Buffer Size field identifies the total amount of data available across all logical channels of a logical channel group after all MAC PDUs for the TTI have been built. The amount of data is indicated in number of bytes. It shall include all data that is available for transmission in the RLC layer and in the PDCP layer; the definition of what data shall be considered as available for transmission, respectively. The size of the RLC and MAC headers are not considered in the buffer size computation. The length of this field is 6 bits. If extended BSR-Size s is not configured, the values taken by the Buffer Size field are shown in Table 2. If extended BSR-Size s is configured, the values taken by the Buffer Size field are shown in Table 3.

TABLE 2

| Index | Buffer Size (BS) value [bytes] |
| --- | --- |
| 0 | BS = 0 |
| 1 | 0 < BS <= 10 |
| 2 | 10 < BS <= 12 |
| 3 | 12 < BS <= 14 |
| 4 | 14 < BS <= 17 |
| 5 | 17 < BS <= 19 |
| 6 | 19 < BS <= 22 |
| 7 | 22 < BS <= 26 |
| 8 | 26 < BS <= 31 |
| 9 | 31 < BS <= 36 |
| 10 | 36 < BS <= 42 |
| 11 | 42 < BS <= 49 |
| 12 | 49 < BS <= 57 |
| 13 | 57 < BS <= 67 |
| 14 | 67 < BS <= 78 |
| 15 | 78 < BS <= 91 |
| 16 | 91 < BS <= 107 |
| 17 | 107 < BS <= 125 |
| 18 | 125 < BS <= 146 |
| 19 | 146 < BS <= 171 |
| 20 | 171 < BS <= 200 |
| 21 | 200 < BS <= 234 |
| 22 | 234 < BS <= 274 |
| 23 | 274 < BS <= 321 |
| 24 | 321 < BS <= 376 |
| 25 | 376 < BS <= 440 |
| 26 | 440 < BS <= 515 |
| 27 | 515 < BS <= 603 |
| 28 | 603 < BS <= 706 |
| 29 | 706 < BS <= 826 |
| 30 | 826 < BS <= 967 |
| 31 | 967 < BS <= 1132 |
| 32 | 1132 < BS <= 1326 |
| 33 | 1326 < BS <= 1552 |
| 34 | 1552 < BS <= 1817 |
| 35 | 1817 < BS <= 2127 |
| 36 | 2127 < BS <= 2490 |
| 37 | 2490 < BS <= 2915 |
| 38 | 2915 < BS <= 3413 |
| 39 | 3413 < BS <= 3995 |
| 40 | 3995 < BS <= 4677 |
| 41 | 4677 < BS <= 5476 |
| 42 | 5476 < BS <= 6411 |
| 43 | 6411 < BS <= 7505 |
| 44 | 7505 < BS <= 8787 |
| 45 | 8787 < BS <= 10287 |
| 46 | 10287 < BS <= 12043 |
| 47 | 12043 < BS <= 14099 |
| 48 | 14099 < BS <= 16507 |
| 49 | 16507 < BS <= 19325 |
| 50 | 19325 < BS <= 22624 |
| 51 | 22624 < BS <= 26487 |
| 52 | 26487 < BS <= 31009 |
| 53 | 31009 < BS <= 36304 |
| 54 | 36304 < BS <= 42502 |
| 55 | 42502 < BS <= 49759 |
| 56 | 49759 < BS <= 58255 |
| 57 | 58255 < BS <= 68201 |
| 58 | 68201 < BS <= 79846 |
| 59 | 79846 < BS <= 93479 |
| 60 | 93479 < BS <= 109439 |
| 61 | 109439 < BS <= 128125 |
| 62 | 128125 < BS <= 150000 |
| 63 | BS > 150000 |

TABLE 3

| | |
| --- | --- |
| 0 | BS = 0 |
| 1 | 0 < BS <= 10 |
| 2 | 10 < BS <= 13 |
| 3 | 13 < BS <= 16 |
| 4 | 16 < BS <= 19 |
| 5 | 19 < BS <= 23 |
| 6 | 23 < BS <= 29 |
| 7 | 29 < BS <= 35 |
| 8 | 35 < BS <= 43 |
| 9 | 43 < BS <= 53 |

TABLE 3-continued

| | |
|---|---|
| 10 | 53 < BS <= 65 |
| 11 | 65 < BS <= 80 |
| 12 | 80 < BS <= 98 |
| 13 | 98 < BS <= 120 |
| 14 | 120 < BS <= 147 |
| 15 | 147 < BS <= 181 |
| 16 | 181 < BS <= 223 |
| 17 | 223 < BS <= 274 |
| 18 | 274 < BS <= 337 |
| 19 | 337 < BS <= 414 |
| 20 | 414 < BS <= 509 |
| 21 | 509 < BS <= 625 |
| 22 | 625 < BS <= 769 |
| 23 | 769 < BS <= 945 |
| 24 | 945 < BS <= 1162 |
| 25 | 1162 < BS <= 1429 |
| 26 | 1429 < BS <= 1757 |
| 27 | 1757 < BS <= 2161 |
| 28 | 2161 < BS <= 2657 |
| 29 | 2657 < BS <= 3267 |
| 30 | 3267 < BS <= 4017 |
| 31 | 4017 < BS <= 4940 |
| 32 | 4940 < BS <= 6074 |
| 33 | 6074 < BS <= 7469 |
| 34 | 7469 < BS <= 9185 |
| 35 | 9185 < BS <= 11294 |
| 36 | 11294 < BS <= 13888 |
| 37 | 13888 < BS <= 17077 |
| 38 | 17077 < BS <= 20999 |
| 39 | 20999 < BS <= 25822 |
| 40 | 25822 < BS <= 31752 |
| 41 | 31752 < BS <= 39045 |
| 42 | 39045 < BS <= 48012 |
| 43 | 48012 < BS <= 59039 |
| 44 | 59039 < BS <= 72598 |
| 45 | 72598 < BS <= 89272 |
| 46 | 89272 < BS <= 109774 |
| 47 | 109774 < BS <= 134896 |
| 48 | 134896 < BS <= 165989 |
| 49 | 165989 < BS <= 204111 |
| 50 | 204111 < BS <= 250990 |
| 51 | 250990 < BS <= 308634 |
| 52 | 308634 < BS <= 379519 |
| 53 | 379519 < BS <= 466683 |
| 54 | 466683 < BS <= 573866 |
| 55 | 573866 < BS <= 705666 |
| 56 | 705666 < BS <= 867737 |
| 57 | 867737 < BS <= 1067031 |
| 58 | 1067031 < BS <= 1312097 |
| 59 | 1312097 < BS <= 1613447 |
| 60 | 1613447 < BS <= 1984009 |
| 61 | 1984009 < BS <= 2439678 |
| 62 | 2439678 < BS <= 3000000 |
| 63 | BS > 3000000 |

For BSR operation in a MAC entity, the buffer status reflects all data available for transmission in a RLC and PDCP entities, where the data available for transmission in each layer is specified in each layer's specification. When the eNB receives a BSR MAC CE, as the buffer status only indicate the total buffer status of RLC and PDCP entities altogether, the eNB cannot tell which amount of data is available in PDCP entity (DATP) and which amount of data is available in RLC layer (DATR). Up to Rel-11, there was no reason to distinguish the DATR and DATP because the UE maintains one MAC entity, RLC entity, one PDCP entity for each logical channel, i.e., one bearer.

In Rel-12, as Dual Connectivity is newly introduced, a new type of bearer is supported, i.e., split bearer, for which the UE maintains one PDCP entity, two RLC entities, and two MAC entities. This basically implies that in PDCP entity the data is split into two RLC entities so that some part of PDCP data is transmitted to the first RLC entity and the other part of PDCP data is delivered to the second RLC entity. In Rel-12, as the split of uplink data transmission is not supported, the buffer status reporting can be reused only by restricting the reporting of data available for transmission in PDCP entity in one of two MAC entities. However, in Rel-13, 3GPP starts to consider support of split of uplink data transmission for split bearer.

In order to support BSR operation for split bearer, a couple of options have been proposed including at least one of: i) Double reporting of DATP to both eNB and eNB coordination, ii) No reporting of DATP to both eNBs, or iii) Split of DATP and reporting each amount to each eNB.

Double reporting of DATP to both eNBs is simple from UE point of view. However, it is ambiguous how the eNB can coordinate without knowing the exact amount of DATP and this may bring waste of uplink resources. No reporting is also simple from UE point of view. However, this may cause reception of less uplink resource than the UE actually needs. Split of DATP is also not easy because it should be discussed how to split the small amount of DATP or how to split the amount of DATP byte aligned.

The only motivation for those options is that each eNB schedules the uplink resource for the data that is to be transmitted to that eNB. In this sense, what really needs to be known to the eNBs is the amount of data in PDCP entities so that the eNBs can coordinate with each other regarding PDCP data transmission or schedule uplink resources accordingly. Therefore, a new mechanism is required to report the amount of DATP by the UE.

FIG. 12 is a conceptual diagram for performing buffer status reporting according to embodiments of the present invention.

In this invention, when a MAC entity reports a buffer status to a corresponding eNB, the MAC entity determines the buffer status by considering only the amount of data available for transmission in the PDCP entity (DATP). In other words, when the UE determines the buffer status, the UE shall not consider the amount of data available for transmission in the RLC entity (DATR) although there is DATR. For this, a new MAC Control Element, i.e., P-BSR MAC CE, is proposed and the MAC entity transmits the P-BSR MAC CE together with BSR MAC CE if a BSR is triggered.

In detail, when the BSR is triggered in the MAC entity (S1201), the UE generates a first BSR MAC CE including information of an amount of data available for transmission in RLC and PDCP entities and a second BSR MAC CE including information of an amount of data available for transmission in the PDCP entity (S1203).

BSR trigger condition that is the same as the previously mentioned: i) when data arrive for a logical channel which has higher priority than the logical channels whose buffers are not empty; ii) when data become available for the UE's buffer, which is empty; iii) when the retxBSR-Timer expires and there is still data in the UE's buffer; iv) when a periodic BSR-Timer expires; or v) when the remaining space in a MAC PDU can accommodate a BSR.

Method for generating a first BSR MAC CE is the same as the conventional method of generating a BSR MAC CE. The first BSR MAC CE includes information about amount of data available for transmission in the RLC entity and the PDCP entity. A buffer status report represents one or all four logical-channel groups. The former is short BSR including one LCG ID field and one corresponding Buffer Size field, and the latter a long BSR including four Buffer Size fields, corresponding to LCG IDs #0 through #3.

The second BSR MAC CE includes the following fields: i) LCG ID field, and ii) buffer size field.

The LCG ID field identifies the group of logical channels for which the amount of DATP is being reported in the second BSR MAC CE.

The Buffer Size field identifies the amount of DATP across all logical channels of a logical channel group after all MAC PDUs for the TTI have been built. The MAC entity shall include only the data that is available for transmission in the PDCP entity. In this case, the data that is available for transmission in the PDCP entity, and the MAC entity shall not consider an amount of data available for transmission in RLC entity when setting the Buffer Size.

The Buffer Size level for BSR is also used for the second BSR MAC CE or a new Buffer Size level for the second BSR MAC CE can be newly defined.

The UE generates a MAC PDU to transmit to a corresponding eNB by including both of the first BSR MAC CE and the second BSR MAC CE in the same MAC PDU (S1205).

Additionally, the eNB can control transmission of the second BSR MAC CE by sending an indication to the UE which requests second BSR MAC CE transmission. The indication is sent to the UE via a RRC, PDCP, RLC, or MAC signaling.

The indication includes the followings: i) Transmission of second BSR MAC CE: set to True to request second BSR MAC CE and set to False to stop second BSR MAC CE transmission, ii) LCG ID: an identifier of logical channel group for which the MAC entity is requested to second BSR MAC CE, e.g., #0, #1, #2, #3, or all logical channel groups, iii) MAC entity ID: an identifier of the MAC entity, e.g., MCG, SCG, or both of MCG and SCG, which is requested to transmit second dBSR MAC CE, or iv) Type of second BSR MAC CE: identify the type of second BSR MAC CE to report, i.e., either short BSR or long BSR.

FIGS. 13A and 13B are examples for type of the second BSR MAC CE according to embodiments of the present invention.

FIG. 13A is a type 1 of second BSR MAC CE including one LCG ID field and one Buffer Size field corresponding to one LCG ID field, and FIG. 13B is type 2 of second BSR MAC CE including four Buffer Size fields corresponding to LCG ID #0 through #3.

The second BSR MAC CE format is identified by MAC PDU subheaders with a specific LCID. For example, LCID=01100 is used for Type 1 of second BSR MAC CE and LCID=01101 is used for Type 2 of second BSR MAC CE.

If Type 1 of second BSR MAC CE is reported even though more than one LCG has data available for transmission in the PDCP entity, an LCID is used which is different from the LCID for Type 1 of second BSR MAC CE that is reported in case only one LCG has data available for transmission in the PDCP entity. I.e., Truncated second BSR MAC CE is used and identified by a separate LCID.

When the MAC entity determines which type of second BSR MAC CE is to be reported to the eNB, the MAC entity determines the type of second BSR MAC CE as follows.

If a Short BSR MAC CE is reported, if a Truncated BSR MAC CE is reported, if the number of remaining bits is equal to or larger than the size of the Type 1 of second BSR MAC CE plus its subheader but smaller than the size of the Type 2 of second BSR MAC CE plus its subheader, if eNB requests to the MAC entity to transmit the second BSR MAC CE for a specific LCG by including the buffer status of a PDCP entity for the LCG, or if eNB requests to the MAC entity to use the Type 1 of second BSR MAC CE, the MAC entity determines to report Type 1 of second BSR MAC CE.

Meanwhile, if a Long BSR MAC CE is reported, if more than one LCG has data available for transmission in PDCP entity in the TTI where the second BSR MAC CE is transmitted, if eNB requests to the MAC entity to transmit the second BSR MAC CE for all LCGs by including the buffer status of a PDCP entity for all LCGs, or if eNB requests to the MAC entity to use the Type 2 of second BSR MAC CE, the MAC entity determines to report Type 2 of second BSR MAC CE.

For Type 1 of second BSR MAC CE, the MAC entity includes the buffer size of a PDCP entity regarding a LCG which is indicated by the eNB. Or, the LCG has data available for transmission in PDCP entity, includes the highest priority logical channel with data available for transmission in PDCP entity, or includes the highest priority logical channel with data available for transmission in either PDCP entity or RLC entity.

FIG. 14 is an example for performing buffer status reporting according to embodiments of the present invention.

The UE receives an indication which requests a P-BSR MAC CE transmission (S1401). The P-BSR MAC CE is a new BSR MAC CE includes only an amount of data available for transmission in the PDCP entity. The P-BSR MAC CE doesn't include an amount of data available for transmission in RLC entity when setting the Buffer Size.

If a BSR is triggered (S1403), a MAC entity indicated by the indication determines to report a BSR MAC CE as one of a Short BSR MAC CE, a Truncated BSR MAC CE, and a Long BSR MAC CE (S1405). The BSR MAC CE is a legacy BSR MAC CE including an amount of data available for transmission in the RLC and PDCP entities.

The MAC entity determines to report a P-BSR MAC CE either by Type 1 or by Type 2 (S1407).

The Type 1P-BSR MAC CE includes one LCG ID field and one Buffer Size field corresponding to one LCG ID field, and Type 2 P-BSR MAC CE includes four Buffer Size fields corresponding to LCG ID #0 through #3.

The MAC entity generates a MAC PDU by including both of the BSR MAC CE and the P-BSR MAC CE in the same MAC PDU (S1409). For the LCP procedure, the MAC entity prioritizes the P-BSR MAC CE over the data from any logical channel, except data from UL-CCCH.

The MAC entity transmits the MAC PDU including both of the BSR MAC CE and the P-BSR MAC CE to the corresponding eNB (S1411), i.e., the MAC entity configured for MCG transmits the MAC PDU including both of the BSR MAC CE and the P-BSR MAC CE to the MeNB while the MAC entity configured for SCG transmits the MAC PDU including both of the BSR MAC CE and the P-BSR MAC CE to the SeNB.

In conclusion, this invention provides a method for reporting an amount of data available for transmission in a PDCP entity to an eNB. The new MAC CE, P-BSR MAC CE, is invented to report the amount of data available for transmission in a PDCP entity. When a BSR is triggered, the UE reports both P-BSR and BSR to the eNB. And the UE reports the amount of data available for transmission in a PDCP entity both MeNB and SeNB, respectively.

The embodiments of the present invention described hereinbelow are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment. It is obvious to those skilled in the art that claims that are not explicitly cited in each other in the appended claims may be presented in combination as an embodiment of the present invention or included as a new claim by subsequent amendment after the application is filed.

In the embodiments of the present invention, a specific operation described as performed by the BS may be performed by an upper node of the BS. Namely, it is apparent that, in a network comprised of a plurality of network nodes including a BS, various operations performed for communication with an MS may be performed by the BS, or network nodes other than the BS. The term 'eNB' may be replaced with the term 'fixed station', 'Node B', 'Base Station (BS)', 'access point', etc.

The above-described embodiments may be implemented by various means, for example, by hardware, firmware, software, or a combination thereof.

In a hardware configuration, the method according to the embodiments of the present invention may be implemented by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, or microprocessors.

In a firmware or software configuration, the method according to the embodiments of the present invention may be implemented in the form of modules, procedures, functions, etc. performing the above-described functions or operations. Software code may be stored in a memory unit and executed by a processor. The memory unit may be located at the interior or exterior of the processor and may transmit and receive data to and from the processor via various known means.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

INDUSTRIAL APPLICABILITY

While the above-described method has been described centering on an example applied to the 3GPP LTE system, the present invention is applicable to a variety of wireless communication systems in addition to the 3GPP LTE system.

The invention claimed is:

1. A method for a User Equipment (UE) operating in dual connectivity with a first e-NodeB (eNB) and a second eNB in a wireless communication system, the method comprising:
triggering a Buffer Status Reporting (BSR) in a Medium Access Control (MAC) entity configured for the first eNB;
generating a first BSR MAC Control Element (CE) including information of an amount of data available for transmission in a Radio Link Control (RLC) entity and a Packet Data Convergence Protocol (PDCP) entity;
generating a second BSR MAC CE including information only of an amount of data available for transmission in the PDCP entity without considering the amount of data available for transmission at the RLC entity;
transmitting a MAC Protocol Data Unit (PDU) including the first and second BSR MAC CEs to the first eNB; and
receiving, from the first eNB, scheduling information for uplink transmission determined based on the first BSR MAC CE and the second BSR MAC CE,
wherein a type of the second BSR MAC CE is determined depending on a type of the first BSR MAC CE, and
wherein the second BSR MAC CE indicates an amount of data associated with coordination related to transmission for a PDCP data between the first eNB and the second eNB among the amount of data available for transmission indicated by the first BSR MAC CE.

2. The method according to claim 1, further comprising: receiving an indicator requesting the second BSR MAC CE transmission from an eNB.

3. The method according to claim 2, wherein the indicator indicates which MAC entity generates the second BSR MAC CE.

4. The method according to claim 2, wherein the indicator indicates for which LCG the second BSR MAC CE includes information of the amount of data available for transmission in the PDCP entity.

5. The method according to claim 1, wherein the second BSR MAC CE is generated by setting a Buffer Size field to the amount of data available for transmission in the PDCP entity for at least one logical channel which belongs to a Logical Channel Group (LCG) of the MAC entity.

6. The method according to claim 5, wherein the type of the second BSR MAC CE includes a first type composed of only one Buffer Size field and a second type composed of multiple Buffer Size fields.

7. The method according to claim 1, wherein the indicator is received via a Radio Resource Control (RRC), PDCP, RLC or MAC signaling.

8. A User Equipment (UE) operating in dual connectivity with a first e-NodeB (eNB) and a second eNB in a wireless communication system, the UE comprising:
a Radio Frequency (RF) transceiver; and
a processor configured to control the RF transceiver,
wherein the processor is configured to:
trigger a Buffer Status Reporting (BSR) in a Medium Access Control (MAC) entity configured for the first eNB,
generate a first BSR MAC Control Element (CE) including information of an amount of data available for transmission in a Radio Link Control (RLC) entity and a Packet Data Convergence Protocol (PDCP) entity,
generate a second BSR MAC CE including information only of an amount of data available for transmission in the PDCP entity without considering the amount of data available for transmission at the RLC entity,
transmit a MAC Protocol Data Unit (PDU) including the first and second BSR MAC CEs to the first eNB,
report the second BSR MAC CE to the second eNB, and
receive scheduling information for uplink transmission determined based on the first BSR MAC CE and the second BSR MAC CE from the first eNB,
wherein a type of the second BSR MAC CE is determined depending on a type of the first BSR MAC CE, and wherein the second BSR MAC CE indicates an amount of data associated with coordination related to transmission for a PDCP data between the first eNB and the second eNB among the amount of data available for transmission indicated by the first BSR MAC CE.

9. The UE according to claim 8, wherein the processor is further configured to receive an indicator requesting the second BSR MAC CE transmission from an eNB.

10. The UE according to claim 9, wherein the indicator indicates which MAC entity generates the second BSR MAC CE.

11. The UE according to claim 9, wherein the indicator indicates for which LCG the second BSR MAC CE includes information of the amount of data available for transmission in the PDCP entity.

12. The UE according to claim 8, wherein the second BSR MAC CE is generated by setting a Buffer Size field to the amount of data available for transmission in the PDCP entity for at least one logical channel which belongs to a Logical Channel Group (LCG) of the MAC entity.

13. The UE according to claim 12, wherein the type of the second BSR MAC CE includes a first type composed of only one Buffer Size field and a second type composed multiple Buffer Size fields.

14. The UE according to claim 8, wherein the indicator is received via a Radio Resource Control (RRC), PDCP, RLC or MAC signaling.

* * * * *